United States Patent [19]
Pan

[11] Patent Number: 5,594,721
[45] Date of Patent: Jan. 14, 1997

[54] METHOD AND SYSTEM FOR IMPLEMENTING AN APPLICATION PROTOCOL IN A COMMUNICATION NETWORK

[75] Inventor: Lyndon M. Pan, Little Silver, N.J.

[73] Assignee: Lucent Technologies Inc., Murray Hill, N.J.

[21] Appl. No.: 365,273

[22] Filed: Dec. 28, 1994

[51] Int. Cl.⁶ .................................................. H04L 12/56
[52] U.S. Cl. ...................... 370/392; 370/465; 379/90
[58] Field of Search ........................... 370/79, 119, 60, 370/94.1, 94.2, 58.2, 110.1; 379/90.91, 93, 94; 395/500; 375/377

[56] References Cited

U.S. PATENT DOCUMENTS

| | | | |
|---|---|---|---|
| Re. 35,050 | 10/1995 | Gibbs et al. | 379/93 |
| 4,893,270 | 1/1990 | Beck et al. | 364/400 |
| 5,115,432 | 5/1992 | Haas | 370/94.1 |
| 5,206,899 | 4/1993 | Gupta et al. | 379/120 |
| 5,220,501 | 6/1993 | Lawlor et al. | 379/90 |
| 5,377,186 | 12/1994 | Wegner et al. | 379/207 |
| 5,384,831 | 1/1995 | Creswell et al. | 379/89 |
| 5,425,090 | 6/1995 | Orriss | 379/112 |
| 5,440,620 | 8/1995 | Slusky | 379/100 |

FOREIGN PATENT DOCUMENTS

| | | |
|---|---|---|
| 4124862 | 1/1993 | Germany. |
| 58-159037 | 9/1983 | Japan. |

*Primary Examiner*—Hassan Kizou
*Assistant Examiner*—Seema S. Rao

[57] ABSTRACT

A method and system for implementing an application protocol between a communication network subscriber and a caller. The system uses a Customer Transaction Profile (CTP) database to store protocol definitions for network subscribers. Each protocol definitions specifies the type nd format of input messages that a subscriber excepts to receive, and the type and format of output messages that the subscriber excepts to send. When a caller attempts to contact the subscriber, the network retrieves the subscriber's protocol definition and uses it to translate communications between the subscriber and the caller.

29 Claims, 4 Drawing Sheets

METHOD AND SYSTEM FOR IMPLEMENTING AN APPLICATION PROTOCOL IN A COMMUNICATION NETWORK

This invention relates to communicating over a telecommunications network, and more particularly to setting up and modifying the application protocol through which users of a telecommunications network communicate.

BACKGROUND OF THE INVENTION

As telecommunications network subscribers seek to optimize their use of the many electronic communication services available to them, there is an increasing demand for networks that can be customized to fit each subscriber's particular needs. Currently, most communications are performed over public networks using standard communication protocols.

The standard communication protocols that are used on most public networks consist essentially of a set of coding rules that characterize the data to be exchanged over the networks. Once the rules are known, data can be encoded and decoded by network users without ambiguity. A drawback of using standardized protocols is that they cannot be redefined and/or customized according to a user's individual needs without making changes to the user's software.

The current state of the art in telecommunications requires network users to modify their software to accommodate changes in the communication protocols. For example, a bank may have a system in place that allows its customers to request account information over the telephone. The bank's system prompts the customer to select a service and the customer depresses one or more Touch Tone™ buttons to supply a response. The bank's computer is programmed to carry out one or more steps in response to each customer request, such as sending a fax when the customer enters a "1", or sending a voice message when the customer enters a "2". This type of system, however, is limited to the preprogrammed responses contained in the bank's software. If the bank would like to modify its system to handle new types of information requests, the bank would have to modify the system software accordingly. One way around this problem would be to have a network operator (such as AT&T) provide an adaptable interface between the customer and the bank. An adaptable interface would allow users to redefine the form of their business communications without incurring the losses of time and money normally associated with modifying their network interfaces. Accordingly, a capability to customize protocols is highly desirable to network users, and, in turn, to the network operators seeking to attract those users.

SUMMARY OF THE INVENTION

In accordance with the present invention a network service subscriber (such as a bank) tells the operator when an incoming message from a caller is expected and the format in which that incoming message should be placed. The operator then translates the caller's message into the subscribers's format before relaying the message to the subscriber. In the same fashion, the subscriber tells the operator when the subscriber expects to send an outgoing message to the caller and the format in which outgoing messages will be placed. The operator translates the outgoing message into a format the caller understands before relaying the message to the caller. In this manner, the dialog between the subscriber and the caller can be varied without modifying either party's interface software. The advantages of such a system are illustrated in the banking example set forth below.

By using the present invention a bank may readily customize the communications carried on between the bank's computer and the bank's customers. The bank's computer would be provisioned with interface software designed to operate with the present invention. Thereafter, to change the bank-customer communication flow, the bank would inform the network operator of any new types of customer requests that the bank intends to answer, the possible responses to those requests, and the format of the requests and responses. The network operator would then use the information provided by the bank to modify a database containing the bank-customer communication protocol. The implementation of the new communication flow is complete after the database is edited. Thus, the implementation of a new bank-customer communication flow involves the mere editing of a database, and neither the bank nor the network operator need modify their respective software.

In a preferred embodiment of the invention, a network operator uses a Customer Transaction Profile (CTP) Database to store current "protocol definitions" for each subscriber (e.g. the bank). This database is stored on computer disk and may be edited at any time to reflect redefinitions of the stored protocols.

To setup a protocol, a subscriber provides the network operator with the specifications of the subscriber's desired protocol. Using these specifications, the operator makes the necessary entries in the CTP database to enable customized communication. The subscriber's CTP file may be edited at anytime. Thus, a subscriber desiring to implement a new protocol simply provides the operator with new specifications which the operator then uses to edit the CTP file and thereby change the protocol.

When communication with a subscriber is initiated by a caller, the subscriber's CTP file is loaded from the disk memory into one of the network's "front end systems" for execution. The front end system reads the file to determine an input message format and an output message format, and then uses these formats to translate communications to and from the subscriber, respectively. Messages sent from the caller to the subscriber pass through the front end system where they are converted into the form specified by the input message format. Messages sent from the subscriber to the caller are sent in the output message format and converted by the front end system from the output format to a format that the caller can understand.

Using the front end system as a translator allows subscribers and callers to change the form of their communications without changing their respective network interfaces. Also, using the CTP to store protocol definitions allows subscribers' protocols to be changed without changing the software programs resident at the front end system.

DETAILED DESCRIPTION

Figure 1:
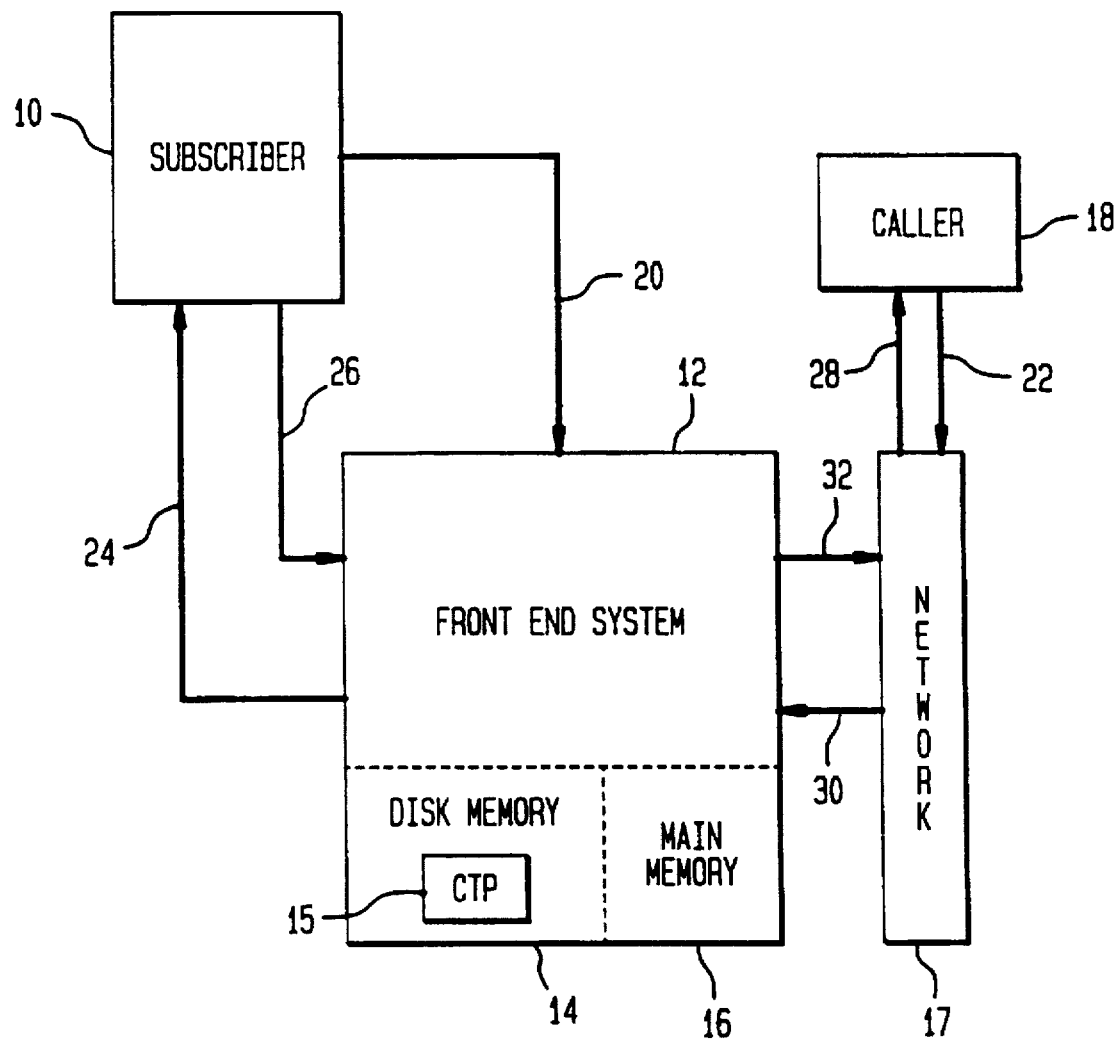
FIG. 1 is a block-schematic diagram of an illustrative communication system incorporating the present invention.
Figure 2:
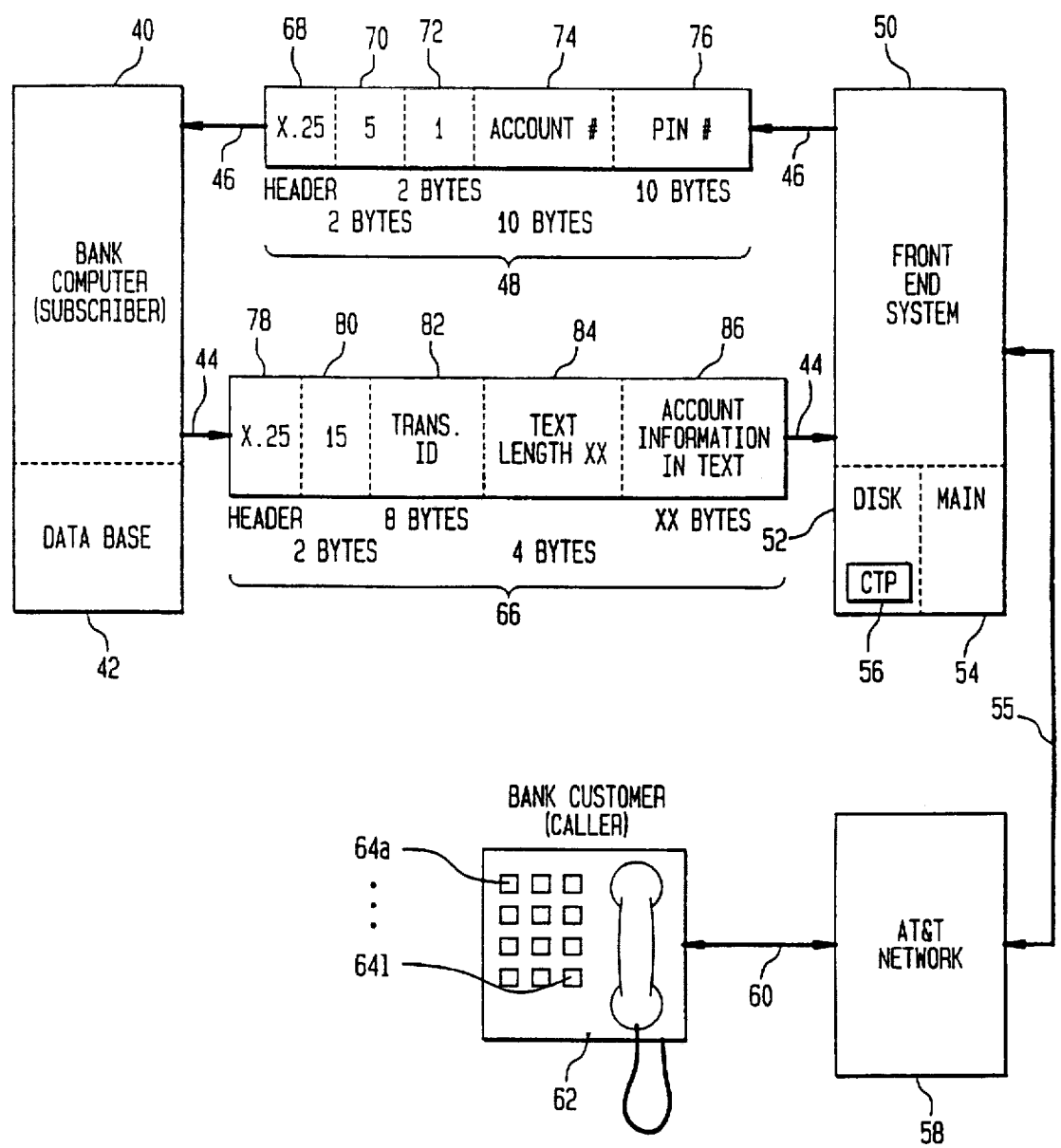
FIG. 2 is a block-schematic diagram of a communication system incorporating a preferred embodiment of the invention.

FIG. 1 is a block diagram of an illustrative embodiment of the present invention. As shown in the figure, the illustrative embodiment includes a subscriber 10, a front end system 12, a network 17, and a caller 18. The front end system may be part of the network or it may be separate from the network, and it may take the form of an electronically automated device such as a personal computer, computer workstation, mainframe computer, or microprocessor. For illustrative purposes the front end system is shown in FIGS. 1 and 2 as being separate from the network. The software necessary to implement the invention is stored in the front end system. This software makes use of data located in a Customer Transaction Profile database (CTP) 15 which is located in a disk memory 14 of the front end system 12.

The CTP contains a separate record for each network subscriber. This record contains instructions concerning how the subscriber wants to communicate over the network at the application software level. Whenever a communication with the subscriber is initiated, front end system 12 accesses disk memory 14 to locate the subscribers CTP record. The record is then loaded into a main memory 16 of the front end system so that the record can be used to control the initiated communication session. Since the CTP contains all the necessary information to implement each subscriber's application protocol, varying the protocol merely requires editing the CTP.

In a preferred embodiment the CTP setup procedure involves the following steps. First, the subscriber's business transaction flow and the "business data" to be exchanged over the interface between the network element and the subscriber's equipment is analyzed. The results of the analysis are recorded into a "business transaction form," defined by the network operator. The purpose of this form is to ensure adequate information for later use and to prevent potential ambiguity. Second, the services (actions) that the network operator will perform to add values and help complete the subscriber's business transaction(s) are identified. The codes for these services/actions are obtained via a "services/actions handbook" provided by the operator (the specific services provided and the way they are activated are beyond the scope of the present invention). Third, the business transaction form is completed by associating appropriate services/actions codes with "each" step of a business procedure. Following the third step, the business transaction flow is stitched together and the associated telecommunication services are lined up, ready for use in executing the subscriber's transaction flow. Finally, the subscriber is assigned an identification number, or "ID number".

A technician "converts" the data recorded in the business transaction form into a Customer Transaction Profile (CTP) using computer software tools and by entering the data into a provisioning system, a computer system separate from the front end system. The provisioning system formats the Profile into a file associated with the subscriber's ID number and downloads that file into a front end system. The Profile, after being downloaded into the front end system, is "indexed' by the system's advanced intelligent software package for use in processing messages associated with the subscriber's ID number. The technician then "turns on" the customer transaction profile in the front end system and the subscriber is "on-line." Once the subscriber is turned on, the network operator executes the subscriber's business transactions according to the agreed upon business data flow.

Messages received by the front end system stimulate the intelligent software package to open the appropriate subscriber Profile as determined from the subscriber ID number. The messages are "decoded" according to the message specifications recorded in the profile. Network services are then activated by the instructions embedded in the messages to add values to the subscriber's business transactions. If the subscriber decides to change the business transaction flow, a new business transaction form is generated, and the information contained in the form is reflected into the subscriber's Customer Transaction Profile. While the CTP is being modified, the existing profile may be "locked" so that it is not referenced for call processing before modification is completed. When modification is complete the new Profile is turned on and may thereafter be used to process calls.

As an alternative to having a technician update the CTP 15, updating may be done directly by the subscriber 10 via a communication coupling 20. Coupling 20, as well as all other communication couplings associated with the invention, may be an existing coupling or a customized coupling; and may be in the form of any of the known types of communication couplings, such as a standard telephone line, a twisted shielded pair line, a coaxial cable, a fiber optic link, or a wireless link.

Once the CTP record is setup for a subscriber the communication flow between the caller 18—any telecommunications device—and the subscriber 10 can proceed. The caller initiates a communication by sending a signal over coupling 22 to network 17. The network is coupled to front end system 12 via coupling 30. The front end system 12 determines which subscriber the call is directed to and loads that subscriber's CTP record into main memory 16. The front end system translates the caller's message into an input format that is specified in the CTP record and then transmits the translated message to the subscriber over coupling 24.

If a reply from the subscriber is required, the subscriber transmits the reply to the front end system over coupling 26. The reply is in an output format that is specified in the subscriber's CTP record. The front end system translates the reply from the output format into a format that can be understood by the caller. Once translated, the reply is transmitted to the network over coupling 32 and is relayed to the caller via coupling 28. This information loop from caller 18 to subscriber 10 and back to caller 18 may be traversed many times during a communication session.

In a preferred embodiment, depicted in FIG. 2, a customer will make requests from a bank's computer by using Touch Tone™ buttons 64a–64l on the customer's phone. Referring to FIG. 2, there is shown a bank computer 40, a front end system 50, a network 58, and a bank customer 62. Also depicted in FIG. 2 are block diagram representations of an input message 48 and an output message 66. The input message is in the input message format, the format into which the front end system will convert messages directed from the customer to the bank computer. The output message is in the output message format, the format in which the bank computer will send messages to the customer. The front end system must convert the bank computer's output message from the output message format to a format that the customer can understand.

A typical transaction between the bank 40 and the customer 62 would proceed as follows. The customer dials "ABC Bank's" service hot-line. The customer is connected to the network through a standard telephone coupling 60. The network then connects the customer to the front end system—via coupling 55—so that the front end system can perform the front-end business interactions for the ABC Bank 40. A software function in the front end system is activated and the dialed number is mapped to a "subscriber ID number" to uniquely identify ABC Bank's CTP record 56. The Bank's CTP record is then read from the front end system's disk memory 52 into the front end systems main memory 54 for active operation.

A sample CTP record to be used in the present illustration is shown in Table I.

The front end system software reads the first instruction specified in the customer's CTP record to start the "business transaction execution". Referring to the CTP record shown in Table I, this first instruction would be an announcement, ABC-0. ABC-0 is played to the customer 62:

(voice) You have reached the ABC Bank's customer service hot line, please make your selection from the following menu:

For your account information, press 1.

For an interest rate update, press 2.

For fund transfer between accounts, press 3.

To end the call, press 0.

The customer makes a selection by pressing one of the Touch Tone™ buttons 64a–64l on the customer's telephone. In the present example, the customer selects #1.

The front end system software then plays an announcement, ABC-1—1, according to the business transaction direction recorded in the CTP record:

(voice) Please enter you account number.

The customer responds with the desired account number.

The front end system software then plays an announcement, ABC-1-2:

(voice) Please enter your PIN number.

The customer responds with the PIN number.

At this time, the front end system software identifies the "*0" sign from the CTP record. The "," indicates that an input message is expected by the ABC Bank and that the ABC Bank will send a reply. The "0" indicates that the front end system should go back to instruction ABC-0 and play the main menu again.

The front end system formats an input message 48 according to the input message format, ABC-1-2, specified in the customer's CTP record. Two lines within the CTP record define the ABC-1-2 format; the first line, "ABC-1-2:(2,2, 10,10)", setting forth a field size for each field in the format, and the second line, "(Query Bank, selection, account #, PIN #)", setting forth a field definition for each field in the format. The field sizes are used by the front end system to formulate an input message "packet" by which the information from the customer is relayed to the bank. The field definitions may be "looked up" by the front end system in a protocol dictionary to determine what action, if any, the front end system should take regarding a particular input or output message.

One way the protocol dictionary may be implemented is through a "look up table", in which each field definition is cross referenced to a computer readable code. A more detailed discussion of the protocol dictionary is not necessary to completely describe the present invention, and is therefore beyond the scope of this application.

In any event, input message format ABC-1-2 consists of the following fields: an X.25 header 68, 2 bytes indicating a data base query 70, 2 bytes indicating the customer's selection 72, 10 bytes representing the customer's account number 74, and 10 bytes representing the customer's PIN number 76. The X.25 header enables the input message "packet" to be transmitted over coupling 46 using the X.25 packet switching protocol. It should be understood that although the X.25 protocol is used in the described embodiment, there are many other well known protocols, such as the Integrated Services Digital Network—Primary Rate Interface (ISDN-PRI) protocol, that may be used to implement the invention. It should also be understood that the size of each field (number of bytes) can be customized for each subscriber.

After receiving the input message 48, the bank computer 40 queries its database 42 and formats an output message 66 according to the output message format 15, specified in the bank's CTP record. The output message consists of: an X.25 header 78, 2 bytes containing a code indicating the front end system service to be performed 80—in this example number 15 means text to speech, 8 bytes indicating the transaction ID 82, 4 bytes indicating the length of the text to be converted 84—in this example XX bytes, and XX bytes containing the text to be converted 86. As was the case with the input message, an X.25 header is needed to transmit the output message "packet" using the X.25 packet switching protocol. The output message is transmitted over coupling 44.

Following transmission of the output message 66 from the bank computer 40 to the front end system 50, the front end system converts the account information 86 into speech and plays the speech to the customer 62 via coupling 55, network 58, and coupling 60. The front end system then plays the main menu, ABC-0, as directed by the "0" in the "*0" indication.

The customer selects #3 to transfer funds from one account to another account.

The front end system collects the customer's input and plays an announcement, ABC-3-1:

(voice) Please enter the account number you wish to transfer funds from.

The customer enters the "from" account number, XXXXXXXXXX.

The front end system then plays an announcement, ABC-3-2:

(voice) Please enter the account number you wish to transfer fund to.

The customer enters the "to" account number, YYYYYYYYYY.

The front end system requests the customer to enter the amount to be transferred, ABC-3—3:

(voice) Please enter the amount to be transferred.

The customer enters the amount, ZZZZZ.

The front end system identifies the "*4" sign from the CTP record. In response to the "*" indication, the front end system formats an input message according to the ABC-3—3 input format specified in the CTP record (NOTE: the ABC-3—3 format is not depicted in FIG. 2). As shown in Table 1, the ABC-3—3 format consists of: 2 bytes indicating a fund transfer, 2 bytes indicating the customer's selection, 10 bytes indicating the "from" account number, 10 bytes indicating the "to" account number, and 10 bytes indicating the amount to be transferred. The bank computer performs the fund transfer and sends a text-to-speech message to the front end system according to output message format 15. The front end system relays the speech to the customer and then responds to the "4" indication in the "*4" sign.

In response to the "4" indication, the front end system announces ABC-4 to the customer:

(voice) If you need fax confirmation, press 1.

If you need paper mail confirmation, press 2.

The customer selects 1 and the front end system requests the customer to enter the phone number for the fax confirmation by playing the announcement ABC-4-1:

(voice) Please enter the fax umber with the area code. This will result in a $1.00 charge to your account you transferred funds to.

The customer enters the fax number. The front end system identifies the "*0" sign and formats an input message to the bank according to the ABC-4-1 input message format. The message takes the form of: 2 bytes indicating a fax confirmation, 2 bytes indicating the customer's selection, and 10 bytes indicating the customer's fax number. The bank then instructs the front end system to originate an output message in output message format 16. The first 2 bytes of the output message indicates the service to be performed by the front end system—in this case #16 indicates text-to-fax service. The next 4 bytes indicates the length of the text to be converted—in this case XX bytes. The last XX bytes contain the text to be converted.

The front end system plays the main menu again, in response to the "0" indication in the "*0" sign and the sequence of operations continues according to the profile.

Figure 3:
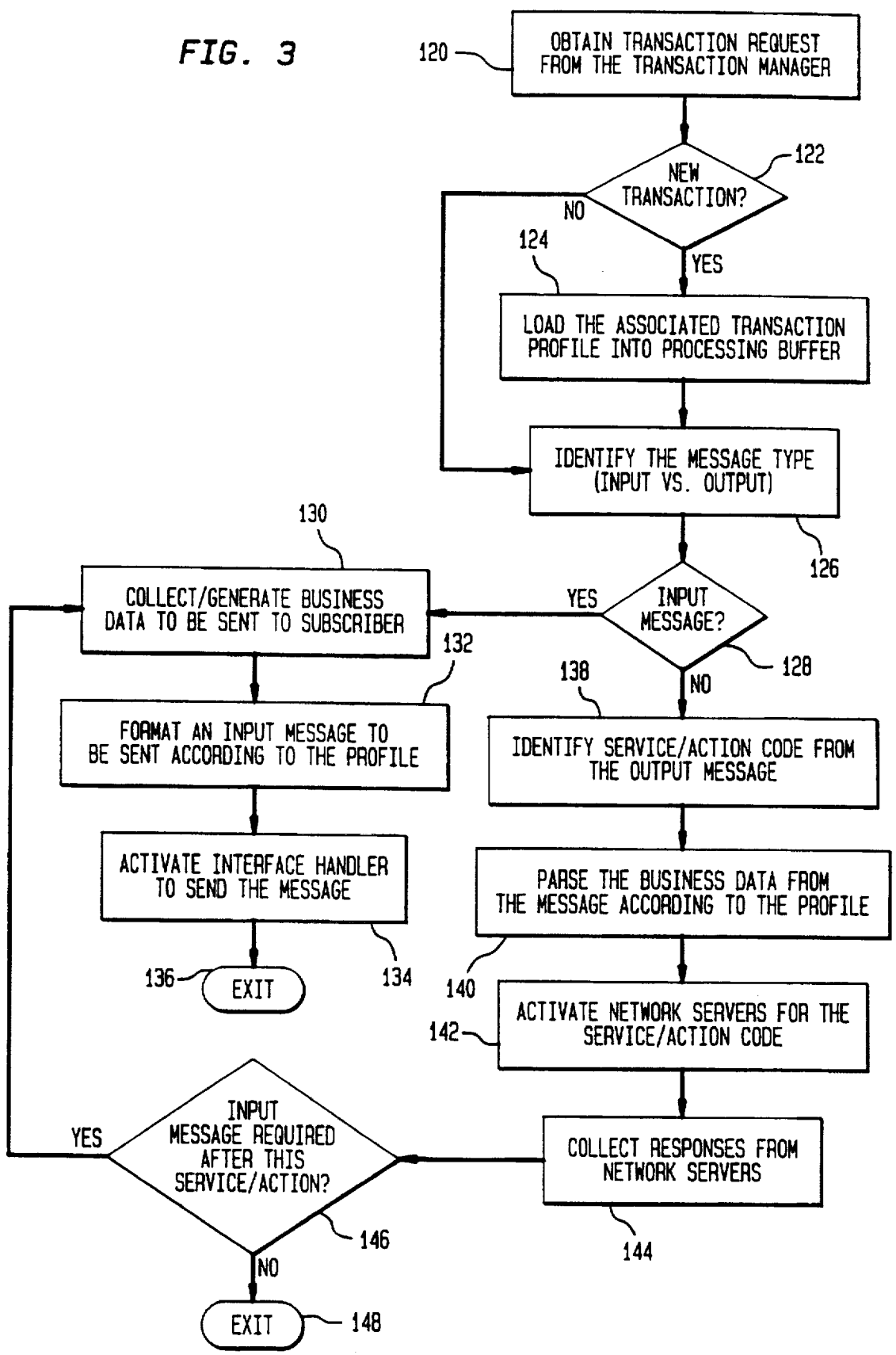
FIG. 3 is a flow chart depicting the sequence of operations according to the invention.

FIG. 3 is a flow chart that shows the steps taken by the front end system in processing communications with the subscriber. As shown in the figure, the front end system must first obtain a transaction request from the transaction manager (step 120). Such a request will be generated whenever the CTP record indicates that an input message will be sent to the subscriber from the front end system, or that an output message is to be sent from the subscriber to the front end system. After receiving a transaction request, the front end system queries as to whether or not a new transaction is being initiated (step 122). If a new transaction is being initiated, the CTP record associated with the transaction must be loaded into the front end system's main memory, or "processing buffer" (step 124). If the transaction request is part of an old transaction, it may be processed using the CTP record currently in the processing buffer.

Once the correct CTP record is loaded into the processing buffer, the front end system proceeds to identify the message type called for by the request, either an input message or output message (step 126). After the message type is identified (step 126), the appropriate processing "branch" is entered (step 128).

When an input message is requested, the input message branch is entered and the front end system takes the following steps. First, the front end system collects the business data to be sent to the subscriber (step 130). In the bank-customer example, the business data to be sent might be a bank account number. Next, the business data is then formatted according to the input message format supplied in the CTP record (step 132). The interface handler is then activated and the input message is sent to the subscriber (step 134). At this point front end system processing of the input message is complete (step 136).

When an output message is requested, the front end system enters the output message "branch" of the flow chart. As a first step in processing an output message, the front end system reads the service code from the output message (step 138). Based on this service code, the front end system accesses the CTP record and locates the corresponding output message format. The front end system uses its knowledge of the format to parse the business data from the output message (step 140). It then activates any network servers that it will need to carry out the service requested in the output message (step 142) and collects responses from those servers (step 144). At this point, the front end system inquires as to whether or not an input message will immediately follow completion of the output message service (step 146). If an immediate input message is required, the input message branch will entered. If an input message is not required, the front end system's processing of the output message is complete (step 148).

Figure 4:
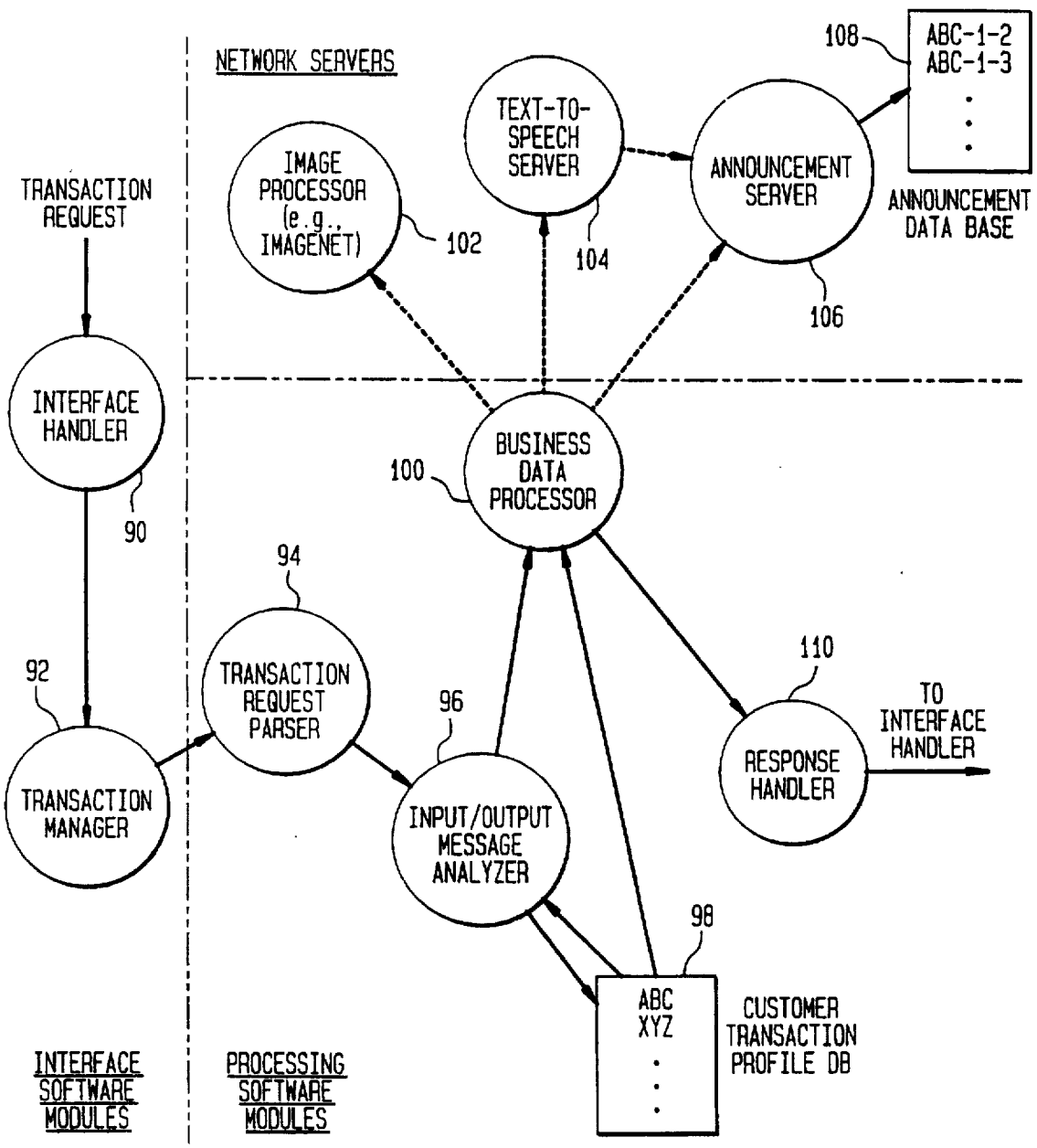
FIG. 4 is a block-schematic diagram showing a configuration of software modules and network servers that may be used to implement a preferred embodiment of the invention.

FIG. 4 shows one configuration of front end system software modules and network servers that may be used to implement the present invention. As shown in FIG. 4, the interface between a subscriber and the front end system includes two software modules, an interface handler 90, and a transaction manager 92. The interface handler performs the signal processing necessary to enable the front end system to communicate using standard Open Systems Interconnection (OSI) protocols. The transaction manager performs the task of identifying the subscriber associated with each transaction request.

After each transaction request has been associated with a subscriber, the nature of the requests are documented by a transaction request parser 94. This documentation is used by an Input/Output message analyzer 96 to access the CTP 98 and obtain the information necessary to process the request. If the request requires the collection or generation of business data, a business data processor 100 handles these tasks. The processor 100 may not be capable of providing all the collection and generation services required, however, it may delegate tasks to one or more network servers.

The business data processor 100 is shown as having access to three different servers, an image processor 102, a text to speech server 104, and an announcement server 106. The announcement server is coupled to an announcement database 108. The database may be used to store a plurality of predetermined subscriber announcements which can be readily recalled from the database by the announcement server. After collection and generation of the business data is complete, the data is passed to a response handler 110. The response handler 110 organizes the data and prepares it for transmission by the interface handler.

TABLE I

| THE CTP | USED IN THE BANK-CUSTOMER EXAMPLE |
|---|---|
| Subscriber ID Number | |
| Customer Business Transaction Specifications: | |
| ABC-0(1,2,3,4) | /* Number in 0 are the valid inputs |
| ABC-1-1(0–99999999) | /* 0: Range for the account number |
| ABC-1-2(0–999)*0 | /* 0: Range for the PIN |
| | /* *: message expected. 0: go back to main menu |
| ABC-3-1(0–99999999) | |
| ABC-3-2(0–99999999) | |
| ABC-3-3(0–99999999)*4 | /* 4: go to ABC-4 after sending message |
| ABC-4(1,2,3) | |
| ABC-4-1*0 | |
| ABC-4-2 | |
| ABC-4-3 | |
| . . . . . . . . . . . . | |
| . . . . . . . . . . . . | |
| Input Messages: | |
| ABC-1-2: (2,2,10,10) /* size of each field in the message | |
| (Query Bank, selection, account #, PIN #) /* field definition | |
| ABC-3-3: (2,2,10,10,10) | |
| (Fund Xfer, selection, acnt # from, acnt # to, xfer amount) | |
| ABC-4-1: (2,2,10) | |
| (Fax confirm, selection, fax number) | |
| . . . . . . . . . . . . | |
| . . . . . . . . . . . . | |
| Output Messages: /* service numbers not specified are not processed | |
| . . . . . . . . . . . . | |
| . . . . . . . . . . . . | |
| 15: (2,4,xx) /* size of each filed for action code #15 | |
| (Action, Length of Text, Text) /*field definition | |
| 16: (2,4,xx) | |
| (Action, Length of Text, Text) | |
| . . . . . . . . . . . . | |
| . . . . . . . . . . . . | |

TABLE I-continued

| THE CTP | USED IN THE BANK-CUSTOMER EXAMPLE |
|---|---|
| Other Characteristics for the Transaction Profile (to be further customized). . . . . . . . . . . . . . . . . . . . . . . . . . . | |

I claim:

1. A method of implementing an application protocol in a communication network, comprising the steps of:

a) defining a customer transaction profile for a network subscriber, said profile being associated with a unique subscriber identification number and an application protocol;

b) storing said customer transaction profile in a database;

c) assigning said unique subscriber identification number to a communication session initiated on said network, said communication session comprising one or more input messages to said subscriber and one or more output messages from said subscriber;

d) using said assigned subscriber identification number to determine a matching customer transaction profile for said communication session, said matching customer transaction profile defining a matching application protocol;

e) accessing said database to retrieve said matching customer transaction profile; and f) using said matching profile during said communication session to translate said input messages and output messages according to said matching application protocol.

2. The method according to claim 1, wherein the step of using said matching profile during said communication session to translate said input messages and output messages according to said matching application protocol comprises the steps of:

forming one or more communication packets according to said matching application protocol;

appending a packet header to each of said one or more communication packets; and transmitting said communication packets using a packet switching protocol.

3. The method according to claim 2, wherein the step of appending a packet header to each of said communication packets comprises the steps of:

creating an X.25 packet header; and appending said one or more X.25 packet header to each of said one or more communication packets.

4. The method according to claim 2, wherein the step of appending a packet header to each of said one or more communication packets comprises the steps of:

creating an ISDN-PRI packet header; and appending said ISDN-PRI packet header to each of said one or more communication packets.

5. The method according to claim 1, further comprising the step of:

modifying said customer transaction profile in response to a request from said subscriber.

6. An apparatus for implementing an application protocol in a communication network, comprising:

a) means for defining one or more customer transaction profiles for a network subscriber, said each of one or more profiles being associated with a unique subscriber identification number and defining an application protocol;

b) a database means for storing said one or more customer transaction profiles; and c) a front end system for assigning one of said unique subscriber identification numbers to a communication session initiated on said network, said communication session comprising one or more input messages directed to said subscriber and one or more output messages directed from said subscriber, using said assigned subscriber identification number to determine a matching customer transaction profile for said communication session, said matching customer transaction profile defining a matching application protocol, accessing said means for storing to retrieve said matching customer transaction profile, and using said matching profile during said communication session to translate said input messages and output messages according to said matching application protocol.

7. The apparatus according to claim 6 wherein each of said unique subscriber identification numbers comprises a telephone number.

8. The apparatus according to claim 6, wherein each of said one or more customer transaction profiles comprises:

one or more message formats that define the format of said input messages and said output messages; and one or more instructions that specify the steps to be taken in implementing the application protocol.

9. The apparatus according to claim 6, wherein each of said one or more customer transaction profiles comprises:

one or more input message formats that define the format of said input messages;

one or more output message formats that define the format of said output messages; and one or more instructions that specify the steps to be taken in implementing the application protocol.

10. The apparatus according to claim 9, wherein each of said one or more input message formats and each of said one or more output message formats comprises:

one or more field sizes; and one or more field definitions.

11. The apparatus according to claim 6, further comprising:

means for coupling said front end system to said network subscriber.

12. The apparatus according to claim 6, further comprising:

means for coupling said database to said front end system.

13. The apparatus according to claim 6, wherein said front end system comprises a computer.

14. The apparatus according to claim 6, further comprising:

means for modifying said customer transaction profiles.

15. An apparatus for implementing an application protocol in a communication network, comprising:

a) means for defining one or more customer transaction profiles, each of said one or more profiles associated with a unique subscriber identification number and an application protocol; and b) a front end system having a disk memory for storing said one or more customer transaction profiles, a main memory into which said one or more customer transaction profiles can be loaded to create one or more loaded profiles, and a means for using said loaded profiles to translate one or more input messages sent from a user of the communication network to a communication network subscriber, and for using said loaded profiles to translate one or more output messages sent from said subscriber to said user.

16. The apparatus according to claim 15, wherein each of said unique subscriber identification numbers comprises a telephone number.

17. The apparatus according to claim 15, wherein each of said one or more customer transaction profiles comprises:

one or more message formats that define the format of said input messages and the format of said output messages, each of said one or more message formats including one or more field sizes and one or more field definitions; and one or more instructions that specify the steps to be taken in implementing the application protocol.

18. The apparatus according to claim 15, further comprising:

means for coupling said front end system to said communication network subscriber.

19. The apparatus according to claim 15, wherein said front end system is a computer.

20. The apparatus according to claim 15, further comprising:

means for modifying said customer transaction profiles.

21. An apparatus for implementing an application protocol in a communication network, comprising:

a) means for defining one or more customer transaction profiles for a network subscriber, each of said one or more profiles being associated with a unique subscriber identification number and defining an application protocol;

b) means for storing said one or more customer transaction profiles; and c) means for assigning one of said unique subscriber identification numbers to a communication session initiated on said network, said communication session comprising one or more input messages directed to said subscriber and one or more output messages directed from said subscriber, using said assigned subscriber identification number to determine a matching customer transaction profile for said communication session, said matching customer transaction profile defining a matching application protocol, accessing said means for storing to retrieve said matching customer transaction profile, and using said matching profile during said communication session to translate said input messages and output messages according to said matching application protocol.

22. The apparatus according to claim 21, wherein each of said unique subscriber identification numbers comprises a telephone number.

23. The apparatus according to claim 21, wherein each of said one or more customer transaction profiles comprises:

one or more message formats that define the format of said input messages and said output messages; and one or more instructions that specify the steps to be taken in implementing the application protocol.

24. The apparatus according to claim 21, wherein each of said one or more customer transaction profiles comprises:

one or more input message formats that define the format of said input messages;

one or more output message formats that define the format of said output messages; and one or more instructions that specify the steps to be taken in implementing the application protocol.

25. The apparatus according to claim 24, wherein each of said one or more input message formats and each of said one or more output message formats comprises:

one or more field sizes; and one or more field definitions.

26. The apparatus according to claim 21, further comprising: means for coupling said means for assigning to said network subscriber.

27. The apparatus according to claim 21, further comprising: means for coupling said means for storing to said means for assigning.

28. The apparatus according to claim 21, wherein said means for assigning comprises a computer.

29. The apparatus according to claim 21, further comprising: means for modifying said one or more customer transaction profiles.

\* \* \* \* \*